(12) United States Patent
Srinivasan et al.

(10) Patent No.: US 9,565,521 B1
(45) Date of Patent: Feb. 7, 2017

(54) AUTOMATIC SEMANTIC LABELING BASED ON ACTIVITY RECOGNITION

(71) Applicant: Samsung Electronics Co., Ltd., Suwon-si, Gyeonggi-do (KR)

(72) Inventors: Vijay Srinivasan, San Jose, CA (US); Yannick Pellet, Davie, FL (US); Abhishek Mukherji, Milpitas, CA (US); Enamul Hoque, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/826,332

(22) Filed: Aug. 14, 2015

(51) Int. Cl.
| | | |
|---|---|---|
| *H04W 24/00* | (2009.01) | |
| *H04W 4/02* | (2009.01) | |
| *H04M 1/73* | (2006.01) | |
| *H04M 1/725* | (2006.01) | |
| *G06Q 30/02* | (2012.01) | |

(52) U.S. Cl.
CPC ........... *H04W 4/02* (2013.01); *H04M 1/72572* (2013.01); *H04M 1/73* (2013.01); *G06Q 30/0205* (2013.01); *H04W 24/00* (2013.01)

(58) Field of Classification Search
CPC .... H04W 4/02; H04W 24/00; H04M 1/72572; H04M 1/73; G06Q 30/0205
USPC ........................ 455/457, 456.1–456.5, 556.1
See application file for complete search history.

(56) References Cited

U.S. PATENT DOCUMENTS

| | | | |
|---|---|---|---|
| 7,822,823 B2 | 10/2010 | Jhanji | |
| 8,438,175 B2 | 5/2013 | Papke et al. | |
| 8,521,680 B2 | 8/2013 | Lin | |
| 8,612,134 B2* | 12/2013 | Zheng | G01S 19/14 701/400 |
| 8,682,345 B2 | 3/2014 | Kuhn et al. | |
| 8,762,102 B2 | 6/2014 | Yuen et al. | |
| 8,832,209 B2 | 9/2014 | Jhanji | |
| 8,886,649 B2* | 11/2014 | Zhang | G06F 17/30011 707/737 |
| 8,918,275 B2 | 12/2014 | Sakazaki | |
| 8,922,657 B2 | 12/2014 | Calman et al. | |
| 2008/0242317 A1* | 10/2008 | Abhyanker | G06F 17/3087 455/456.3 |
| 2008/0248809 A1 | 10/2008 | Gower | |

(Continued)

FOREIGN PATENT DOCUMENTS

| | | |
|---|---|---|
| EP | 1939797 A1 | 7/2008 |
| WO | 2012038781 A1 | 3/2012 |

*Primary Examiner* — Mong-Thuy Tran
(74) *Attorney, Agent, or Firm* — Sherman IP LLP; Kenneth L. Sherman; Hemavathy Perumal

(57) ABSTRACT

A method and device for automatic semantic labeling of unlabeled places using activity recognition. A method includes determining at least one activity based on analyzing electronic device sensor data. Localization for the electronic device is performed to determine location for an unknown semantic place. An observed mapping between the at least one activity and the location for the unknown semantic place is determined. A typical mapping between the at least one activity and at least one semantic place is determined. Using the observed mapping and the typical mapping from one or more other electronic devices, the unknown semantic place is assigned with a semantic place label representing the at least one semantic place for identifying the unknown semantic place. A semantic place map is updated to include the semantic place label.

30 Claims, 9 Drawing Sheets

(56) References Cited

U.S. PATENT DOCUMENTS

| | | | |
|---|---|---|---|
| 2008/0268876 A1* | 10/2008 | Gelfand | G06Q 30/02 455/457 |
| 2010/0304788 A1* | 12/2010 | Mun | H04M 1/72572 455/556.1 |
| 2011/0229032 A1* | 9/2011 | Ranganathan | G06K 9/00664 382/171 |
| 2011/0276396 A1 | 11/2011 | Rathod | |
| 2012/0109720 A1 | 5/2012 | Kibby et al. | |
| 2012/0136865 A1* | 5/2012 | Blom | G06F 17/30141 707/739 |
| 2012/0239504 A1 | 9/2012 | Curlander et al. | |
| 2013/0288703 A1 | 10/2013 | Yang et al. | |
| 2013/0339383 A1* | 12/2013 | Song | G06F 17/3087 707/769 |
| 2014/0058801 A1 | 2/2014 | Deodhar et al. | |
| 2014/0068451 A1* | 3/2014 | Ngo | H04M 1/72572 715/738 |
| 2014/0074873 A1* | 3/2014 | Ngo | G06F 17/30241 707/758 |
| 2014/0101169 A1 | 4/2014 | Kurata et al. | |
| 2014/0106773 A1 | 4/2014 | Li | |
| 2014/0161362 A1* | 6/2014 | Cao | G06K 9/6202 382/224 |
| 2014/0171099 A1* | 6/2014 | Sydir | H04W 4/021 455/456.1 |
| 2014/0364149 A1 | 12/2014 | Marti et al. | |
| 2015/0006290 A1 | 1/2015 | Tomkins et al. | |
| 2015/0088492 A1 | 3/2015 | Liu et al. | |
| 2015/0161439 A1* | 6/2015 | Krumm | G06K 9/00624 382/113 |
| 2015/0268058 A1* | 9/2015 | Samarasekera | G06K 9/00637 701/409 |
| 2015/0302013 A1* | 10/2015 | Sung | G06F 17/3071 707/739 |
| 2015/0339371 A1* | 11/2015 | Cao | H04L 67/306 707/737 |
| 2016/0189186 A1* | 6/2016 | Fabrikant | G06Q 30/0205 705/7.34 |
| 2016/0282126 A1* | 9/2016 | Watts | G01C 21/206 |

* cited by examiner

- Nearest Neighbor assignment based on distance between activity probability vectors

- Supervised learning based on training data with labeled places and associated activities. For example, using:
  - SVM
  - Decision tree

AUTOMATIC SEMANTIC LABELING BASED ON ACTIVITY RECOGNITION

TECHNICAL FIELD

One or more embodiments generally relate to semantic map labeling, in particular, to automatic semantic labeling of unlabeled places based on activity recognition.

BACKGROUND

Automatic mapping and localization technologies require knowledge of the semantics of a significant place or room, for example a gym or a bathroom. Therefore, in order to update maps with semantics, the burden is on a user to manually enter a label for each place or room that is not already labeled.

SUMMARY

One or more embodiments generally relate to automatic semantic labeling of unlabeled places using activity recognition. In one embodiment, a method includes determining at least one activity based on analyzing electronic device sensor data. Localization for the electronic device is performed to determine location for an unknown semantic place. An observed mapping between the at least one activity and the location for the unknown semantic place is determined. A typical mapping between the at least one activity and at least one semantic place is determined. Using the observed mapping and the typical mapping from one or more other electronic devices, the unknown semantic place is assigned with a semantic place label representing the at least one semantic place to the location for the unknown semantic place. A semantic place map is updated to include the semantic place label.

In one embodiment, an apparatus includes an activity recognizer processor configured to determine at least one activity based on analyzing electronic device sensor data. A device localizer processor is configured to perform localization for the electronic device to determine location for an unknown semantic place. A mapping process operates with a processor that is configured to determine an observed mapping between the at least one activity and the location for the unknown semantic place, and to determine a typical mapping between the at least one activity and at least one semantic place. A semantic place labeler process operates with the processor that is further configured to use the observed mapping and the typical mapping from one or more other electronic devices to assign the unknown semantic place with a semantic place label representing the at least one semantic place to identify the unknown semantic place, and to update a semantic place map to include the semantic place label.

In one embodiment a non-transitory processor-readable medium that includes a program that when executed by a processor performs a method that includes determining at least one activity based on analyzing electronic device sensor data. Localization is performed for the electronic device to determine location for an unknown semantic place. An observed mapping is determined between the at least one activity and the location for the unknown semantic place. A typical mapping is determined between the at least one activity and at least one semantic place. Using the observed mapping and the typical mapping from one or more other electronic devices, the unknown semantic place is assigned with a semantic place label representing the at least one semantic place for identifying the unknown semantic place. A semantic place map is updated to include the semantic place label.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
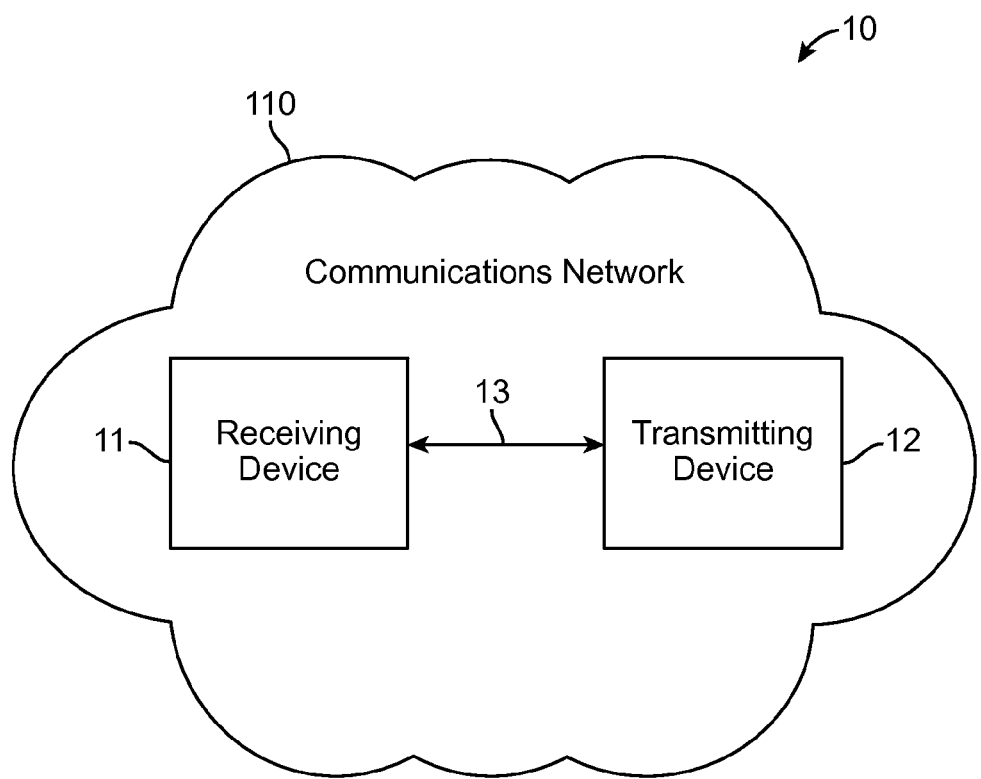
FIG. 1 shows a schematic view of a communications system, according to an embodiment.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Embodiments relate to automatic semantic labeling based on activity recognition. In one embodiment, a method includes determining at least one activity based on analyzing electronic device sensor data. Localization for the electronic device is performed to determine location for an unknown semantic place. An observed mapping between the at least one activity and the location for the unknown semantic place is determined. A typical mapping between the at least one activity and at least one semantic place is determined. Using the observed and typical mappings between activities and semantic places from one or more users, the unknown semantic place is assigned with a semantic label representing the at least one semantic place for identifying the unknown semantic place. A semantic place map is updated to include the semantic label.

One or more embodiments automatically label the semantics of a place in an indoor or outdoor map without requiring manual effort or selection of labeling. Examples of semantic labels may include terms such as: gym, coffee shop, bedroom, cubicle, cafeteria, family room, kitchen, etc.

In addition to labeling the semantics of a place, one or more embodiments eliminate location noise that makes it difficult to differentiate between two neighboring indoor or outdoor places. One embodiment may be used to not only label the semantics of a place, but also the specific franchise if applicable, such as a particular franchised name of a coffee shop, a particular franchised name of a gym, or a sub-category (e.g., distinguishing two bedrooms). In one embodiment, by using unique activity patterns, user identities or layout of a place, the particular franchised place or sub-category may be determined. For example, first franchise semantic place (e.g., a first gym) versus a second franchise semantic place (e.g., a second gym) based on the unique exercises, equipment and the layout in these places. As another example, in a home, two bedrooms may be distinguished based on which user uses the room based on mobile or wearable device ID (e.g., a parent's bedroom versus a child's bedroom).

One or more embodiments automatically label the semantics of a place by automatically recognizing the activities of users in that place and mapping the observed user activities to a semantic location label. In order to perform labeling, one or more embodiments automatically learn the typical mapping between user activities and the semantic label. For example, if a user is mostly exercising in a particular place, it may be labeled as a gym. If the user mostly uses a place for sleeping, it is likely to be a sleeping area or bedroom. To automatically recognize user activities, one or more embodiments may apply machine learning processes or algorithms on sensor data from a smartphone or wearable device.

FIG. 1 is a schematic view of a communications system 10, in accordance with one embodiment. Communications system 10 may include a communications device that initiates an outgoing communications operation (transmitting device 12) and a communications network 110, which transmitting device 12 may use to initiate and conduct communications operations with other communications devices within communications network 110. For example, communications system 10 may include a communication device (receiving device 11) that receives the communications operation from the transmitting device 12. Although communications system 10 may include multiple transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), BLUETOOTH®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a BLACKBERRY®). Such protocols may include, for example, GSM, GSM plus EDGE, CDMA, quadband, and other cellular protocols. In another example, a long range communications protocol can include Wi-Fi and protocols for placing or receiving calls using VOIP, LAN, WAN, or other TCP-IP based communication protocols. The transmitting device 12 and receiving device 11, when located within communications network 110, may communicate over a bidirectional communication path such as path 13, or over two unidirectional communication paths. Both the transmitting device 12 and receiving device 11 may be capable of initiating a communications operation and receiving an initiated communications operation.

The transmitting device 12 and receiving device 11 may include any suitable device for sending and receiving communications operations. For example, the transmitting device 12 and receiving device 11 may include mobile telephone devices, television systems, cameras, camcorders, a device with audio video capabilities, tablets, wearable devices, and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., e-mails, text messages, media messages), video communication, or combinations of these (e.g., video conferences).

Figure 2:
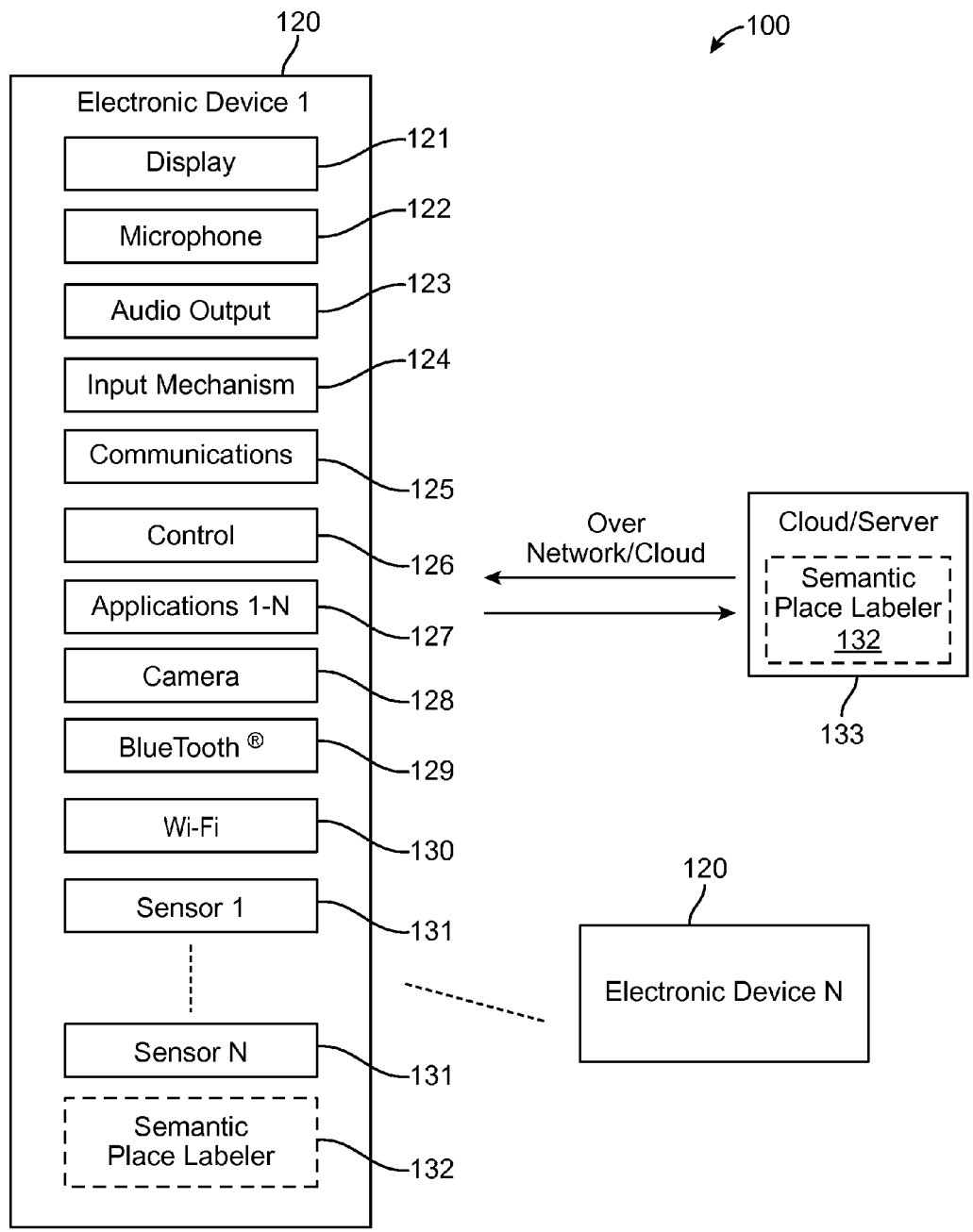
FIG. 2 shows a block diagram of architecture for a system including a server and subscribed electronic devices, according to an embodiment.

FIG. 2 shows a functional block diagram of an architecture system 100 that may be used for updating an indoor or an outdoor map with semantic labels using one or more electronic devices 120. Both the transmitting device 12 and receiving device 11 may include some or all of the features of the electronics device 120. In one embodiment, the electronic device 120 may comprise a display 121, a microphone 122, an audio output 123, an input mechanism 124, communications circuitry 125, control circuitry 126, Applications 1-N 127, a camera 128, a BLUETOOTH® interface 129, a Wi-Fi interface 130 and sensors 1 to N 131 (N being a positive integer), semantic place labeler 132 and any other suitable components. In one embodiment, applications 1-N 127 are provided and may be obtained from a cloud or server 133 via a communications network 110, etc., where N is a positive integer equal to or greater than 1. In one embodiment, the system 100 includes the semantic place labeler component 132 that uses activity and location data from one or more electronic devices 120 to determine the semantic label of an unknown location. The semantic place labeler 132 could reside in the electronic device 120 or in the cloud/server 133.

In one embodiment, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In one embodiment, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., BLUETOOTH® headphones or a BLUETOOTH® headset).

In one embodiment, the display 121 may include any suitable screen or projection system for providing a display visible to the user. For example, display 121 may include a screen (e.g., an LCD or LED screen) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, or a touch screen. The input mechanism 124 may include a multi-touch screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), BLUETOOTH®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the Bluetooth® protocol to couple the electronics device 120 with a BLUETOOTH® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include an automatic speech recognition (ASR) application, a dialog application, a map application, a media application (e.g., QuickTime, MobileMusic.app, or MobileVideo.app), social networking applications (e.g., FACEBOOK®, TWITTER®, INSTAGRAM®, etc.), an Internet browsing application, etc. In some embodiments, the electronics device 120 may include one or multiple applications operative to perform communications operations. For example, the electronics device 120 may include a messaging application, a mail application, a voicemail application, an instant messaging application (e.g., for chatting), a videoconferencing application, a fax application, or any other suitable applications for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In one embodiment, the camera 128 comprises one or more camera devices that include functionality for capturing still and video images, editing functionality, communication interoperability for sending, sharing, etc., photos/videos, etc.

In one embodiment, the BLUETOOTH® interface 129 comprises processes and/or programs for processing BLUETOOTH® information, and may include a receiver, transmitter, transceiver, etc.

In one embodiment, the electronics device 120 may include multiple sensors 1 to N 131, such as accelerometer, gyroscope, microphone, temperature, light, barometer, magnetometer, compass, radio frequency (RF) identification sensor, global positioning system (GPS), etc. In one embodiment, the multiple sensors 1-N 131 provide information to the semantic place labeler 132 (e.g., a processor, an interface, etc.). In one embodiment, the multiple sensors 1-N 131 may be aggregated or used from different electronic devices, such as an electronic device 1 120 (e.g., a smartphone) and another electronic device N 120 (e.g., a wearable device). For example, a gyroscope sensor and/or a temperature may be used from a wearable device, and a microphone sensor may be used from a smartphone.

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

Figure 3:
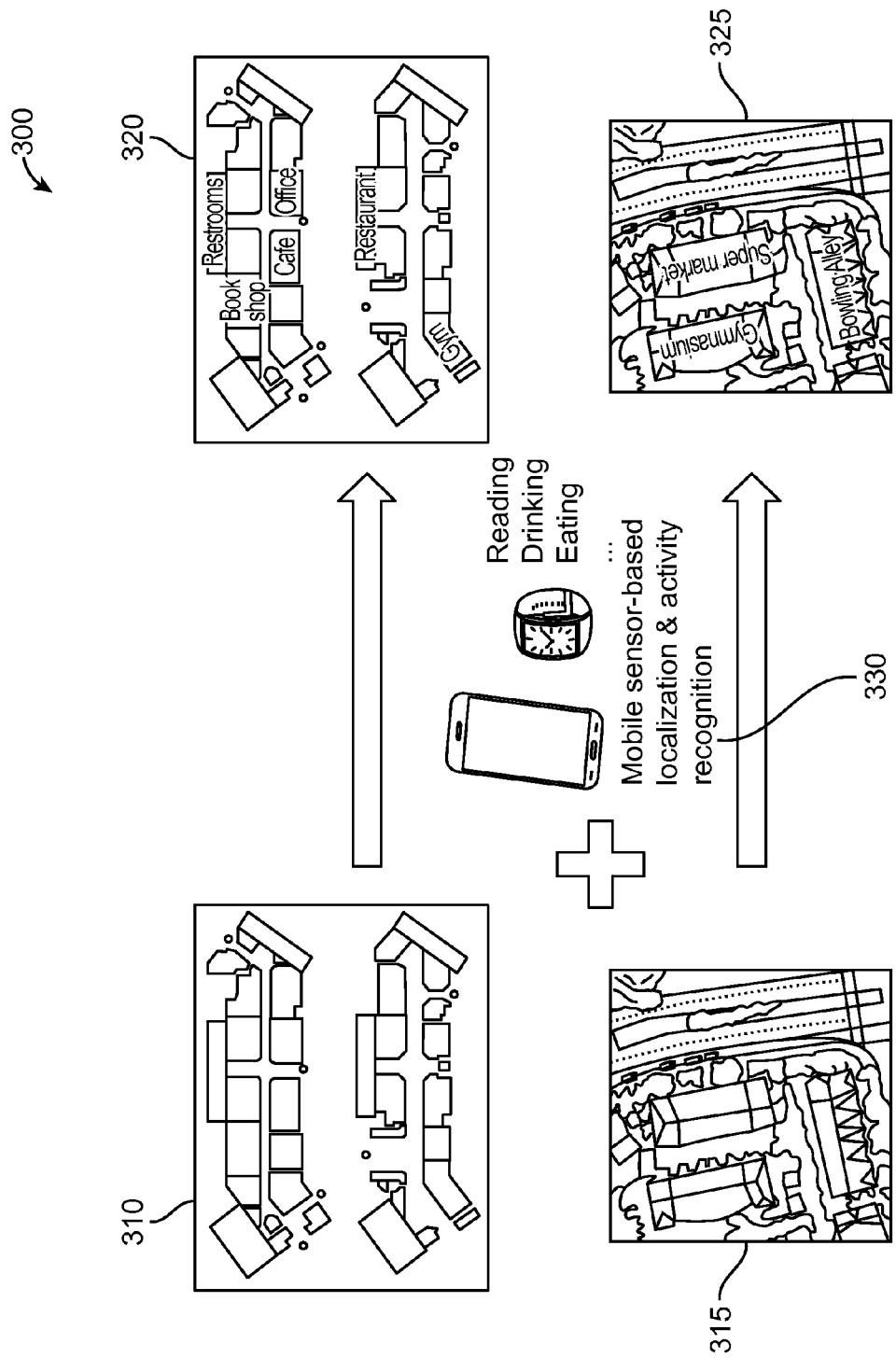
FIG. 3 shows an example high level view of updating a map with semantic place labels, according to an embodiment.

FIG. 3 shows an example high level view 300 of updating a map with semantic place labels, according to an embodiment. In one embodiment, an indoor map 310 does not include any semantic place labels. After processing 330 using sensors (e.g., sensors 1-N 131) from an electronic device 120 (e.g., a smartphone) and/or another electronic device 120 (e.g., a wearable device) for localization and activity recognition (e.g., eating, drinking, reading, exercising, sleeping, etc.), the determined semantic place labels are added to the indoor map to result in a modified labeled indoor map 320.

In another embodiment, an outdoor map 315 without semantic place labels is processed with processing 330 and results in the determined semantic place labels being added to the outdoor map 315 to result in a modified labeled outdoor map 325. In one embodiment, the semantic labels are automatically added to a map with the semantics of a place by recognizing the activities of user(s) as sensed and determined by one or more electronic devices (e.g., electronic device(s) 120, or server 133, FIG. 2) in that place, and mapping these activities to a semantic place label. In one example, if an electronic device 120 senses a user is sleeping, reading, and watching TV with probabilities of 0.7, 0.2, and 0.1 (out of 1.0), respectively, in a specific place, that place may likely be a bedroom.

In one embodiment, mappings between user activities and semantic place labels are automatically and dynamically learned. In one example, the mapping used is a probability vector that indicates the likelihood of observing different activities in a place. For example, for a kitchen, activities of cooking (0.7 probability) and eating (0.3 probability) may be observed.

In one embodiment, the precise location of an electronic device (user location) may be determined and neighboring places, such as coffee shop versus a gym, may be distinguished based on the sensed activity that a user is performing (e.g., drinking versus exercising). In one embodiment, the semantic place labeler 132 may differentiate between two semantic places with the same temporal occupancy patterns; for example, a coffee shop and library may have the same patterns of user occupancy but may be differentiated using the different typical activities observed in these places, namely reading vs. drinking.

In one or more embodiments, multiple types of maps may be updated with semantic place labels. In one example, the map types may include in-home maps, commercial building maps (e.g., office buildings, shopping malls, airports, etc.) and outdoor maps. In one embodiment, for in-home maps, a map of a home is automatically built or maps are updated with semantic place labels for rooms and individual areas in the home, such as kitchen sink, refrigerator, stove, bed, couch, washing machine, dryer, microwave, stereo, television, etc. In one embodiment, in-home semantic maps facilitate medical monitoring applications for elderly individuals and automatic energy conservation in homes, for example, setting a particular temperature (e.g., lowering temperature during the winter) in a bedroom if sleeping. Automatic semantic labeling for elderly residents is very useful as these residents may not be technically knowledgeable enough to add manual semantic labels.

Semantic labeled maps of commercial buildings are automatically built or unlabeled maps are updated with semantic place labels, according to one embodiment. Building semantic maps enables advertising and navigation for commercial buildings, such as shopping malls, airports, and hospitals, and for providing energy conservation based on semantic indoor location of visitors in shopping malls, offices and other commercial buildings. For example, lighting may be turned on based on location of visitors, and turned off when no visitors are present; cooling/heating may be controlled based on presence of visitors, based on the number of visitors (e.g., a threshold of a particular number of visitors), monitors showing merchandise, advertising, etc., may be turned on or off based on the presence of visitors, lighted decorations or animated decorations may be turned on or off based on presence of visitors, etc.

Semantic labeled maps of outdoor areas, such as parks are automatically built or unlabeled maps are updated with semantic place labels. Such outdoor semantic labeled maps enable people to locate places of interest in outdoor areas easily, for example, the location of swings or other play areas for children in parks.

Conventional systems only label the major semantic places, such as "home" and "work" based on either manual user labeling or automatically based on temporal occupancy patterns. One or more embodiments differ from the conventional systems by determining a label and labeling a larger set of semantic places within a home (e.g., bedroom, kitchen, family room, etc.), work place (e.g., cubicle, differentiating cubicles, conference room, etc.), coffee shop, library, food court, restroom, etc.

Figure 4:
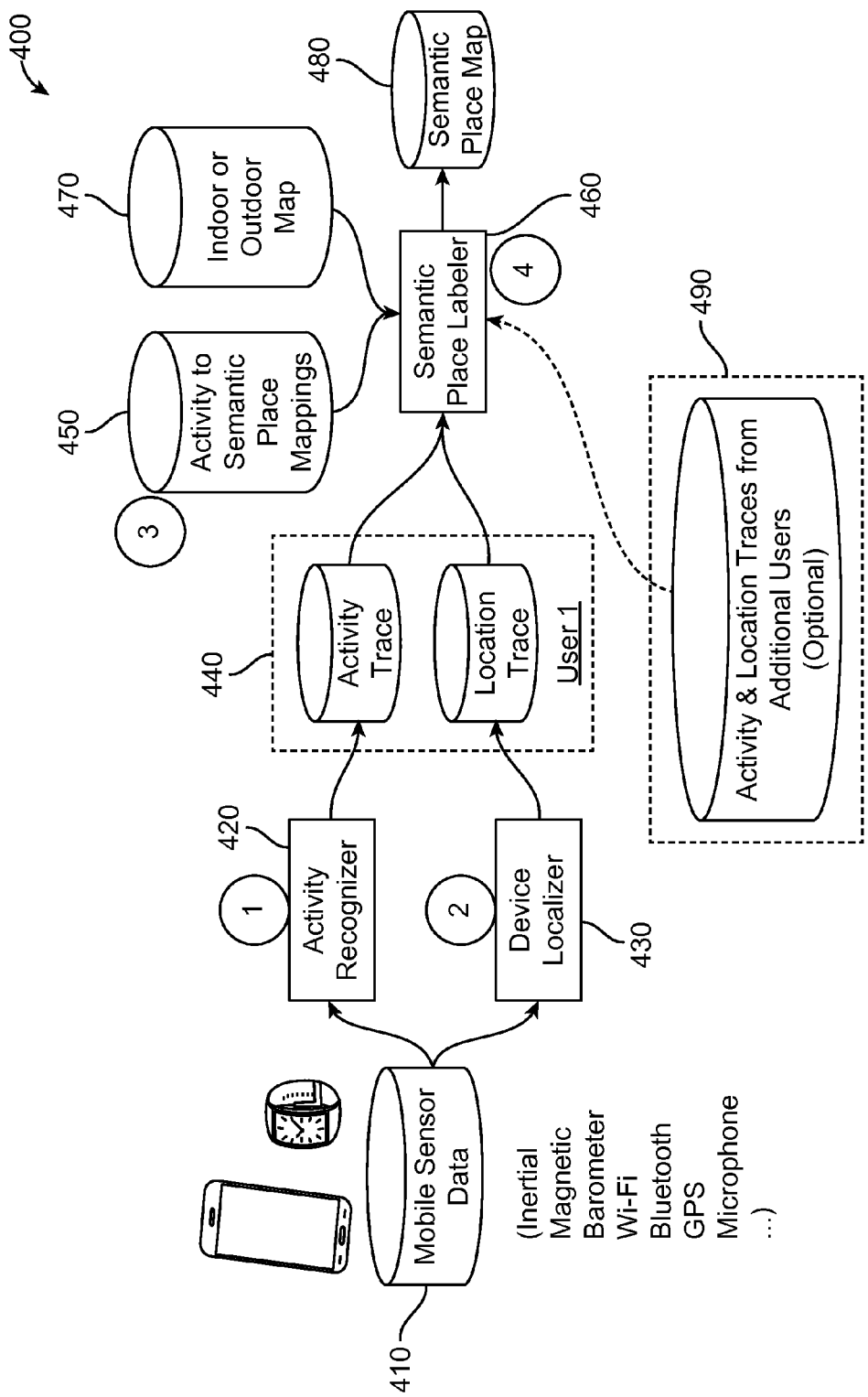
FIG. 4 shows an example operational flowchart for an automatic semantic place labeling system, according to an embodiment.

FIG. 4 shows an example operational flowchart for an automatic semantic labeling system 400, according to an embodiment. In one embodiment, sensor data 410 is obtained from sensors 131 1-N from one or more electronic devices 120 (e.g., a smartphone, a wearable device, or a combination of both, etc., FIG. 2). The activity recognizer processor 420 recognizes user activities from mobile sensor data 410 (e.g., inertial sensors, magnetic sensors, barometer, Wi-Fi signal strength data, BLUETOOTH® signal strength data, GPS data, microphone data, etc.) as input, processes the input and outputs recognized activities. In one embodiment, activity recognizer processor 420 resides on a microchip, Integrated circuit (IC), etc., includes processing logic for recognizing activities, memory devices, and one or more microprocessors. Activities recognized include eating, reading, sleeping, drinking, working, etc. In one example, the activities recognized are based on matching training data, matching patterns of sensed data, etc.

In one embodiment, the device localizer processor 430 infers or determines the location of the user's electronic device(s) 120, either at indoor or outdoor granularity using simultaneous localization and mapping techniques for an indoor location or GPS/Wi-Fi based approaches for outdoor location determination. The device localizer processor 430 uses the mobile sensor data 410 as input, processes the input and outputs location traces from one or more users (e.g., location trace 440 or 490). In one embodiment, the device localizer processor 430 resides on a microchip, IC, etc., includes processing logic for determining location traces from one or more users (e.g., location trace 440 or 490), memory devices, and one or more microprocessors.

In one embodiment, trace information 440 (activity trace and location trace) for a particular user (e.g., user with ID of 1) and activity and location traces from additional users 490 may be determined and collected. The trace information 440 includes activity trace information that the particular user performs, and the location trace includes particular locations where the activities are performed.

In one embodiment, activity to semantic place mappings 450 contains the typical mappings between user activities and semantic places (learned by machine learning techniques for example). The techniques to learn this mapping are further described below. In one embodiment, the activity to semantic place mappings 450 includes a mapping process that operates with a processor that is configured to determine an observed mapping between at least one activity and the location for an unknown semantic place, and to determine a typical mapping between the at least one activity and at least one semantic place.

In one embodiment, semantic place labeler 460 automatically labels the semantic information of places in the indoor or outdoor map 470 (e.g., generated, supplied by third parties, obtained over a network, etc.) by first combining the activity traces from one or more users (e.g., activity trace 440 and 490) output by the activity recognizer processor 420 and the location traces from one or more users (e.g., location trace 440 or 490) output by the device localizer processor 430, to compute the observed activity to place mappings for each place. Next, the system compares the observed mappings to the learned typical mappings between activities and semantic places from the activity to semantic place mappings 450 to output the final semantic place map 480. In one example, the final semantic place map is the indoor or outdoor map 470 that has been updated with the semantic place labels for unlabeled places. In one embodiment, semantic place labeler 460 includes a semantic place label process that operates with a processor that is configured to use the observed and typical mappings between activities and semantic places from one or more users (of electronic devices) to assign the unknown semantic place with a semantic label representing the at least one semantic place to identify an unknown semantic place, and to update a semantic place map to include the semantic label.

Figure 5:
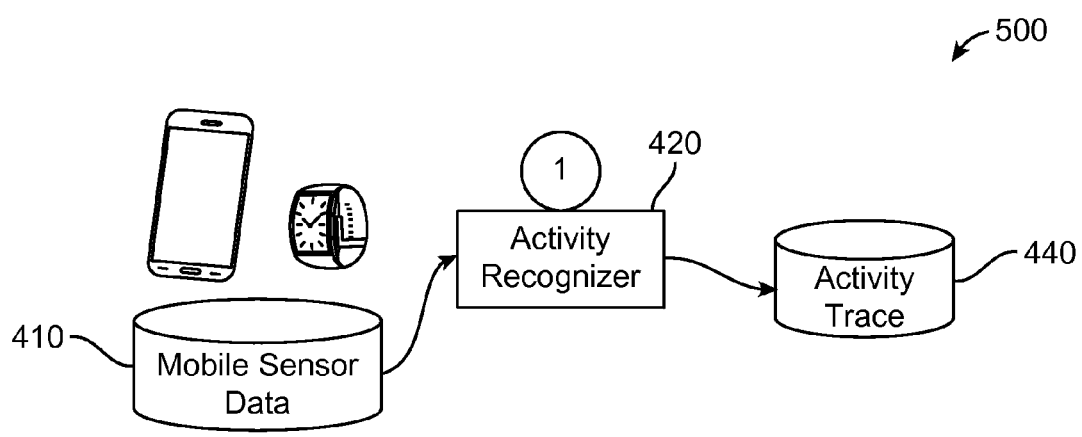
FIG. 5 shows an example of activity recognition, according to an embodiment.

FIG. 5 shows an example 500 of activity recognition, according to an embodiment. The activity recognizer processor 420 applies supervised or unsupervised learning processes or algorithms (e.g., dynamic time warping, feature extraction and support vector machine (SVM) classification, feature extraction and clustering, etc.) on sensor data 410 to infer multiple activities for semantic place labeling, such as eating, washing hands, reading, sleeping, cooking, washing dishes, typing, exercising, etc.

Figure 6:
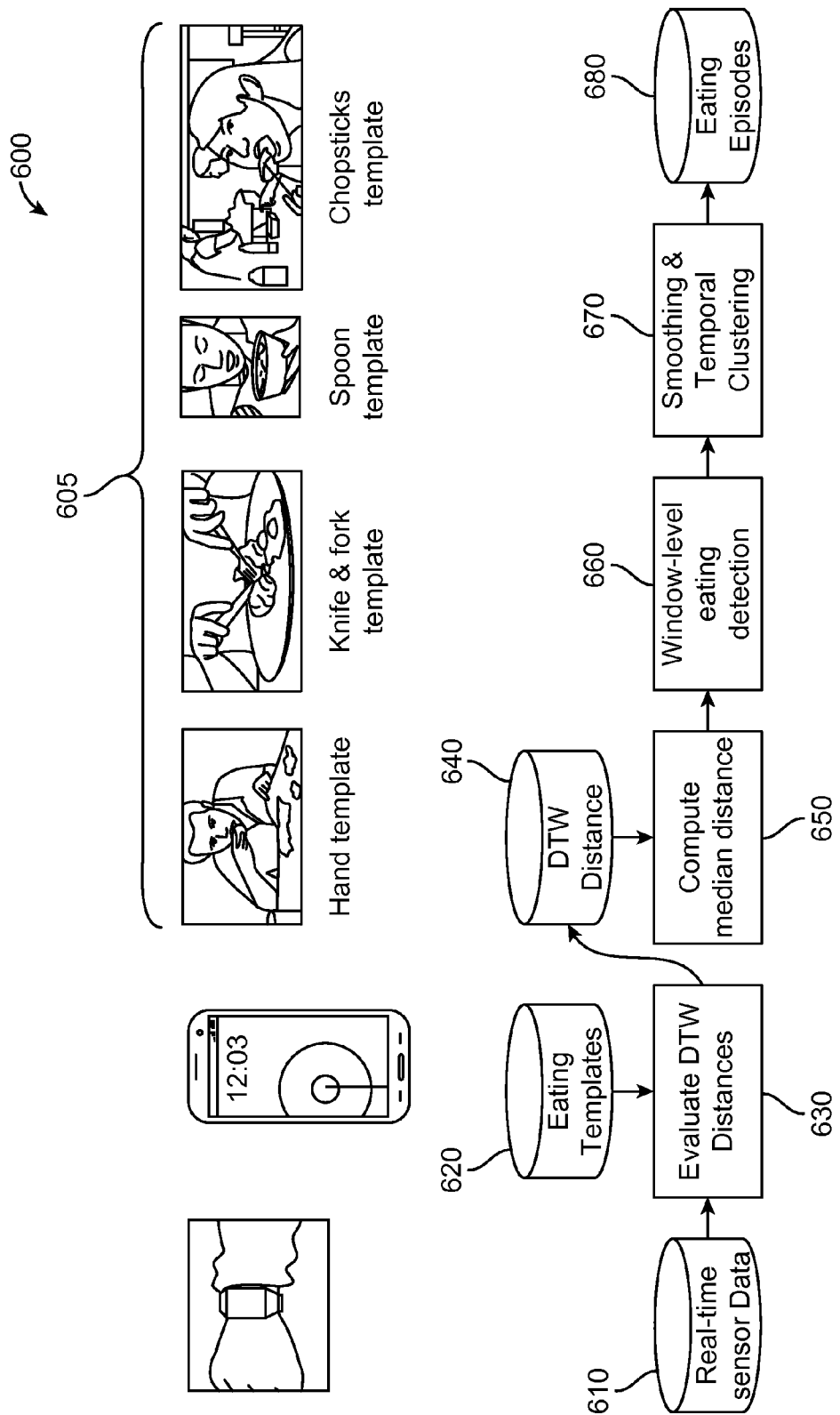
FIG. 6 shows an example flowchart for an example activity recognition based on dynamic time warping, according to an embodiment.

FIG. 6 shows an example flowchart 600 for an example of activity recognition based on dynamic time warping, according to an embodiment. In the example flowchart 600, the example activity recognizer described is for an eating activity recognition using dynamic time warping. In one embodiment, a combination of electronic devices 120 (e.g., a smartphone and a wearable device) are used for eating recognition. In one example, sensor data 610, such as accelerometer sensor data (e.g., real-time streaming sensor data) from the first electronic device 120 (FIG. 2; e.g., a wearable device) is used to detect the eating activity. In one embodiment, in a training phase, a series of templates 605 for different types of eating from multiple users are collected, such as eating with hand, a knife and fork, a spoon, chopsticks, etc.

In one embodiment, after obtaining the sensor data 610, distances are computed by evaluating the distances between each test accelerometer window and the stored eating templates 620 collected during the training phase using dynamic time warping (DTW) at block 630 (evaluate DTW distances). In one embodiment, the median distance is computed at block 650 (compute median distance) among all DTW distances 640 (e.g., stored in memory either on an electronic device 120 or a server or cloud computing device 133, FIG. 2).

In one embodiment, the median DTW distance is compared to a threshold to compute the eating status of the accelerometer window at block 660 (window-level eating detection). If the DTW distance is below a threshold, the window is labeled as eating. In one embodiment, smoothing and temporal clustering are performed at block 670 (smoothing and temporal clustering) over the window-level eating results to compute the major eating episodes of the user, such as eating breakfast, lunch or dinner, which are stored at block 680. The smoothing and temporal clustering process at block 670 eliminates false positives due to certain noisy accelerometer windows being labeled as eating.

In one example, for evaluation of one embodiment, a total of 18.9 hours of accelerometer data was collected from five (5) subjects. For the training phase, a total of 108 eating templates were collected from five (5) users with five (5) different eating styles, namely eating with hand, spoon, fork, chopsticks, and with knife and fork. Two evaluation metrics are defined for eating recognition, namely:

1. Eating episode recall: Proportion of ground truth eating episodes detected; and
 2. Eating episode precision: Proportion of detected eating episodes that are true positives.

The following results for recall and precision are obtained by varying the parameters of the processing, such as the DTW distance threshold. As shown in Table 1 below, it is shown that the system processing achieves high recall and precision, especially for the use case of automatically labeling the semantics of a place. For such a use case, the high precision operating point 4 in Table 1 is preferable, since high precision (low false positives) is preferred in activity recognition in order to identify the semantics of a place, even if a few activities of the user are missed in that place.

TABLE 1

|   | Type | Recall | Precision |
|---|------|--------|-----------|
| 1 | Balanced | 90.91% | 86.96% |
| 2 | Balanced | 86.36% | 90.48% |
| 3 | High Recall | 100% | 61.11% |
| 4 | High Precision | 68.18% | 93.75% |

Figure 7:
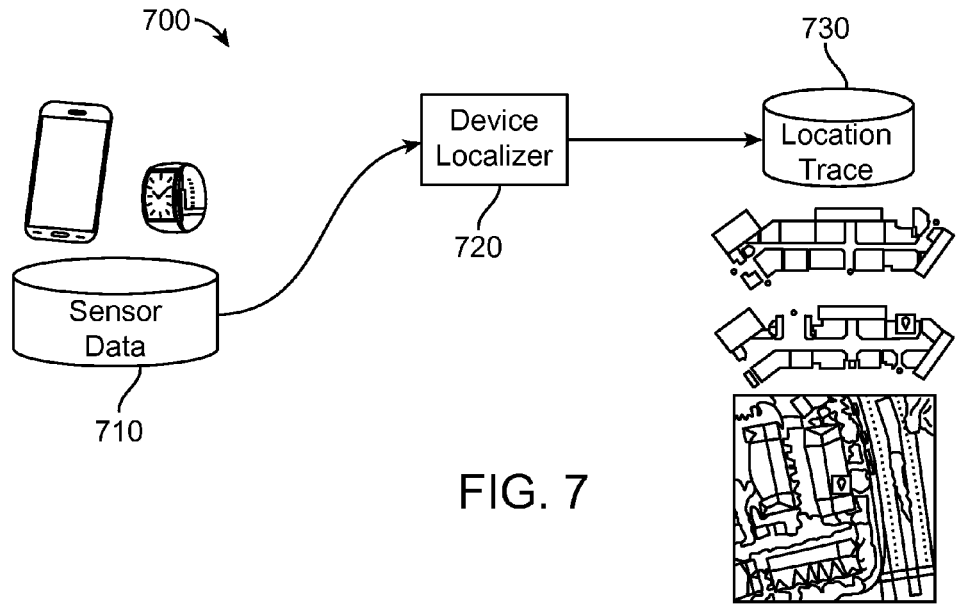
FIG. 7 shows an example flowchart or device localization, according to an embodiment.

FIG. 7 shows an example flowchart 700 for device localization, according to an embodiment. In one embodiment, indoor localization may include triangulation techniques, simultaneous localization and mapping (SLAM) techniques, use of inertial data and wireless signal strengths, etc. In the example 700, after obtaining sensor data 710 (e.g., inertial magnetic, barometer, Wi-Fi, BLUETOOTH®, GPS, microphone, etc.) the device localizer 720 performs indoor and outdoor localization. For indoor localization, in one example simultaneous localization and mapping techniques may be employed, using a combination of inertial sensor data and wireless signal strength to perform the localization and mapping. For outdoor localization, the goal is to determine the building or place that the user's electronic device is located within. To infer outdoor location, in one example a combination of available data, such as GPS, Wi-Fi, or cellular signal information may be used with existing phone APIs. Distance-based clustering is then performed on the outdoor location data to infer the set of places that the user visits and the current place that the user is located in. The results are stored as the location trace data 730.

In one embodiment, the system learns the typical mapping between user activities in a place and the semantic label of that place. This mapping is represented as the conditional probability distribution of observing an activity in a semantic place. For example, the mapping between user activities and the semantic place label of a bedroom may be represented using the following conditional probability distribution: P(sleeping|bedroom)=0.6, P(reading|bedroom)=0.3, P(watching TV|bedroom)=0.1. In one embodiment, four possible techniques may be used to learn the mapping between user activities and semantic places.

One embodiment uses a manual map creation technique. This technique relates to manually creating the map between user activities and the semantic place category based on domain knowledge about the activities people perform in places. In one example, domain-specific mappings may be manually created for different domains, such as places in a shopping mall, a home, outdoor places, etc.

In another embodiment, a technique of mining the mapping from a text corpus is employed. In one example, the mapping is learned by performing text mining on a large text corpus, such as web pages, books, etc. In one example, natural language processing (NLP) techniques are used to learn the typical activities people perform in different places. In one embodiment, the conditional probability is obtained based on frequency counting the number of mentions of different activities in a given place.

In yet another embodiment, a technique of learning the mapping from labeled training data is employed. In one example, the mapping is learned based on manually labeled training data. In one embodiment, labeled activities, place data, and semantic labels on the place data are collected as training data. In one example, the conditional probability mapping is learned based on frequency counting on the labeled training data.

In one embodiment, yet another technique of using existing knowledge bases is employed. In one example, the map is learned using existing structured knowledge bases, such as the Massachusetts Institute of Technology (MIT) common sense database to mine for the mapping between user activities and the semantic places the activities occur in.

Figure 8:
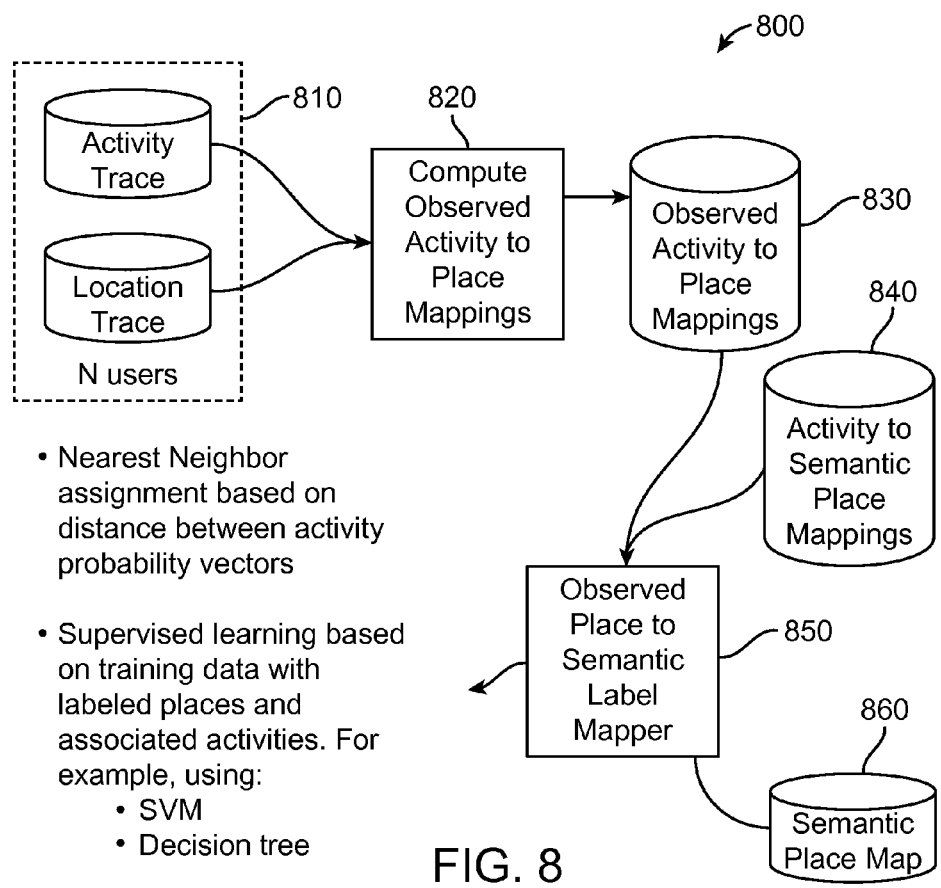
FIG. 8 shows an example overview for semantic place labeling, according to an embodiment.

FIG. 8 shows an example 800 of an overview for semantic place labeling, according to an embodiment. In one embodiment, using the input activity and location trace 810, the observed mapping is computed between user activities and semantic places at block 820 and stored in block 830 (e.g., in memory, a database, a storage device on an electronic device 120 or server 133, FIG. 2). In one example, two example places with different distributions of user activities are listed below:
 Place 1: sleeping=0.8, reading=0.15, watching TV=0.05
 Place 2: cooking=0.8, washing=0.1, eating=0.1
To map places, such as place1 and place2, to a semantic label at block 850, the above observed place mapping is compared to the learned mapping between activities and place labels stored at block 840. For example, the mapping listed below may be a learned mapping for the places of bedroom and kitchen:
 Bedroom: sleeping=0.6, reading=0.3, watching TV=0.1
 Kitchen: cooking=0.7, washing=0.2, eating=0.1
In one embodiment, each place is then assigned to a semantic label using one of several techniques as follows. In one example, an approach is implemented using a nearest neighbor classifier. For each unknown place, the Cartesian distance is determined between the observed conditional probability vector for that place and the learned conditional probability vectors for semantic places, such as bedroom and kitchen. Each unknown place is assigned to that semantic label which has the lowest Cartesian distance. In addition to using nearest neighbor, in one embodiment constraints may be enforced, such as ensuring that each home has one bedroom, living room, kitchen etc. Such constraints may be enforced with a bi-partite matching approach between unknown places and a reasonable mixture of known places for a home.

In one embodiment, another approach that may be implemented is to use a machine learning approach to label unknown places using the conditional probability vector as the feature vector. Supervised classifiers are used, such as SVM or a decision tree trained on conditional probability vectors obtained from labeled place and activity data from several places for each category, such as bedroom, coffee shop, etc.

In one embodiment, the semantic label is output for each unknown place to generate the semantic place map 860. In the example described above, semantic labels are provided as follows:
 Place 1=bedroom
 Place 2=kitchen
In one embodiment, the semantic labeling system 400 described with reference to FIGS. 4-8 is very scalable and scales linearly with respect to the number of location and activity traces provided by electronic devices of multiple users. Offline learning of mapping between user activities and labels scales linearly. Online update of semantic place labels also scales linearly.

The semantic labeling system 400 converges to the correct semantic label for each place very quickly based on a few characteristic activities from each place from one or more users.

In addition to the approach of automatically labeling semantic places using user activities, in various embodiments the following two additional approaches are implemented to use activity recognition output in the context of semantic localization. In one example, activity information is combined with existing maps to eliminate location noise: in real-time, the noise in location systems may be eliminated by recognizing and mapping the activities that a user is involved in with nearby semantic places. For example, an indoor localization system may point to either a coffee shop or a nearby gym. However, by recognizing the user is exercising based on sensor data, the semantic labeling system 400 may determine that the user is more likely to be in the gym rather than the coffee shop.

In one embodiment, activity information may be used along with user or device identity, or a unique layout of places to determine specific category of a semantic place: the recognized user activity may be combined along with other information, such as the identity of the user, the unique equipment and layout of a place to further identify the sub-category of a semantic place. For example, in a home environment, based on the identity of the user obtained from the device ID, along with user activity information, the semantic labeling system 400 may differentiate between, for example, a child's bedroom and a parent's bedroom. In a shopping mall environment, the semantic labeling system 400 may differentiate between a men's shoe store versus a women's shoe store based on user identity. Similarly, based on the unique exercise styles or patterns enabled by specific equipment and space layout, the semantic labeling system 400 may differentiate between multiple franchises of a gym, such as a first nationally franchised gym versus a second nationally franchised gym.

In one embodiment, the semantic labeling system 400 uses crowd-sourced sensor-based activity recognition to: automatically update or generate a semantic map of an indoor or outdoor space; automatically generate the fingerprint signature for each semantic area; and accurately localize the electronic device of a user to the correct semantic location in real-time. In one example, in a consumer retail setting, the semantic labeling system 400 may be used to automatically update or generate a semantic map based on the activities recognized. This may be performed at two levels. At a shop level, the semantic label of the shop may be identified as a whole, for example, a gym may be identified based on exercise activity; a café may be identified based on drinking behavior, etc. In one example, a semantic label may be determined based on an aisle level. In one embodiment, the semantic map layout of a big box store may be identified, and further identification may be made for different sections of the store based on user activities, such as zones for: shirts, trousers, skirts, perfume, belts, gloves, fitting rooms, watches, rest rooms, etc.

In addition to generating the semantic map above, in one embodiment, the fingerprint (e.g., magnetic, Wi-Fi, BLU-ETOOTH®, or other sensor signature) for each semantic location is determined by the simultaneous localization and mapping techniques and may be used to automatically determine the semantic location of the user in real-time. In one embodiment, in addition to the semantic and fingerprint map, determining the activity of a user in real-time also helps to reduce location error and accurately determine semantic location in real-time.

In one embodiment, even if the semantic map is available for download from the shopping mall or shop owner, it still does not contain the fingerprint signature of each semantic location, which is critical in performing localization and identifying the real-time semantic location of the user. The fingerprint signature for each semantic location is determined by simultaneous mapping and localization techniques. Semantic activity information serves as a landmark input to the simultaneous localization and mapping techniques to generate accurate fingerprint signatures. In one example, the semantic labeling system 400 determines semantic labeling using crowd-sourced sensing and activity recognition. In one example, the semantic labeling system 400 provides real-time activity information, which is useful to disambiguate any noise in the semantic location of the user in real-time applications. Without use of the semantic labeling embodiments, one would have to periodically and manually collect fingerprint data from each semantic location employing multiple users, which is very expensive considering the large number of indoor venues that need to be mapped; this is a prohibitive barrier to enabling real-time localization applications in consumer retail. Even if fingerprint is collected once, it needs to be updated periodically due to changing Wi-Fi access points and networks. One or more embodiments automatically compute dynamic physical semantic map. Thus, an approach of one or more embodiments of generating fingerprint signatures for each semantic location by combining with simultaneous localization and mapping techniques improves accuracy and performance. It should be noted that it is very challenging to get accurate semantic maps of indoor shopping malls and retail stores. Typically, these are the proprietary rights of the architecture firm or the shopping mall owner and digital versions are not periodically updated in all locations.

In many big box stores, the layout of items in the store is dynamically changed over time to maximize sales. The process of periodically updating the map is also very expensive and is solved by automatic semantic mapping by one or more embodiments.

One or more embodiments may be directed for the following uses. In one example, the information obtained by one or more embodiments may be used for location based ads/commerce and electronic couponing (or other incentive messaging). In one embodiment, relevant mobile ads may be shown or sent to electronic devices of users and coupons may be sent or shown to users at the right time instant based on their instantaneous fine-grained semantic location and shopping behavior. In one example, the one or more embodiments may show mobile coupons and ads for shoes when the user is browsing in the shoe aisle of a store as determined by the semantic labeling system 400. In another example, a rewards program for coffee shops may be shown when a user is in a coffee shop. In yet another example, ads for jewelry may be shown when the user is browsing in a jewelry store. In still another example, offers for gym memberships may be shown when a user is visiting a gym.

In one embodiment, the semantic labeling system 400 may show mall owners analytics regarding how many people are eating in a certain restaurants or shopping for shoes in a particular shoe store in the mall (e.g., at a particular time of day, a period of times or dates, etc.); the analytics may be used by store owners to increase their revenue by understanding their customer behavior trends. In one embodiment, a local search for semantic locations, such as searching for the nearest café or shoe store in a shopping mall or service subscriptions may be employed.

In one embodiment, resident activities in homes may be used to automatically generate the semantic and fingerprint map of the home. In one example, the activities relevant to smart home semantic mapping and localization include daily activities, such as brushing, washing hands, cooking, sleeping, watching TV, opening the refrigerator, using the dishwasher, coffee maker, rice cooker, microwave, washing machine, etc. The semantic location labels that are generated include labels, such as living room, kitchen, bedroom, refrigerator/microwave/coffee maker area, couch, bed, dining room, etc. In addition to the function of the room, one or more embodiments may identify which resident a room belongs to, based on the identity associated with the mobile device; for example, a child's bedroom versus a parent's bedroom. In a mid-size smart home, anywhere from 30-50 important semantic locations that are important may be used to enable applications, such as remote healthcare, energy conservation, home automation or security. A key pain point for configuring smart home systems is the manual effort involved in (a) creating the physical semantic map showing the various semantic labels of rooms or areas, and (b) creating a fingerprint signature for each semantic location by manually and periodically collecting training data from each location. In one example, especially for elderly health monitoring, it is unreasonable to expect high technical expertise from elderly residents to periodically and manually provide training data to generate the fingerprint map for each semantic location. Even for other demographics, the requirement of periodically training the fingerprint for each semantic location may be a prohibitive hurdle for smart home systems.

In one embodiment, there are several key smart home applications that are enabled by semantic mapping and localization in homes. For example, smart home services based on interaction with Internet of Things (IoT)/Smart Things: based on the user's semantic location, the system may enable several context-aware services on smart appliances in homes and Smart Things devices. For example, when the semantic labeling system 400 recognizes that the user is in the living room study area, the semantic labeling system 400 may automatically switch on the lights in the study area of the room and dim the other lights based on the user's preferences by interfacing with the smart switches and plugs offered as IOT devices. If the semantic labeling system 400 recognizes that the resident is in the kitchen and near the refrigerator, a smart reminder may be provided through the refrigerator that milk is low and if it needs to be added to the to-buy list. If the semantic labeling system 400 recognizes that the user is near the sink or dishwasher, it may provide a reminder to start the dishwasher if there are enough dishes.

In one embodiment, elderly/invalid healthcare monitoring in homes may employ the semantic labeling system 400. In one example, the semantic labeling system 400 recognizes elderly residents' daily activities based on their semantic location in homes, such as cooking, sleeping or washing hands. This is a critical requirement for remote elderly monitoring smart home applications to allow health-care providers to monitor the residents' overall health. In one example, if the resident is eating in bedroom more often instead of the dining room, the semantic labeling system 400 can detect potential anomalous behavior indicating depression. If the resident is visiting a bathroom more often than usual, this may indicate a health issue. If the resident is lying down in the kitchen for a long period, this may indicate a health emergency that might need immediate attention.

In one embodiment, for home security/emergency scenarios, in case of a fire or home invasion or elderly resident emergency, it is very useful for first responders (firefighters, security personnel or police) to be aware of the semantic layout of the home, and where the current residents in the home are located. Having this information provided by the semantic labeling system 400 prior to arrival in the home saves a few seconds or minutes, which is very critical in emergency situations. In one embodiment, the semantic labeling system 400 determines multiple locations based on activities and identification (e.g., device identification) and determines a semantic label for the determined multiple locations. The multiple semantic labels are applied to a layout to update the layout (e.g., of a home, an apartment building, a hotel/motel, etc.). The updated layout may be provided to first responders in advance or at a moment of need through a cloud or server 133 (or other means, such as BLUETOOTH®, cellular, Wi-Fi, etc.). The first responders will then have the layout with semantic labels for emergency situations without having to obtain floor maps from a city entity, which would not detailed semantic labels that are differentiated based on identification.

In one embodiment, energy conservation or automation may use the semantic labeling system 400. The energy consumption of the home may be reduced by understanding the semantic location of the resident. For example, the temperature may be lowered while the user is sleeping in the bedroom during the winter, or the lights in the living room may be dimmed when the user is on the living room couch and watching TV.

In one embodiment, the public user data is anonymized before sharing with the cloud where the actual aggregation and semantic labeling happens. The only data required by default is that some user is detected to be performing an activity. No data identifying the user or the device such as IMEI or phone ID is shared for the semantic labeling task. However, with the users' permission, such data may be shared within the devices in a single home or family to determine additional details about the semantic label, such as resident A's bedroom, a child's room, or a parents' room. Similarly, if users agree to share their gender information, it can be used to detect a men's shoe section versus a women's shoe section; from just the gender alone, it is not possible to identify the user since the other data is anonymized.

In one embodiment, the power overhead in using the semantic labeling system 400 comes from data upload to the cloud and from collecting data from the sensors on the electronic device. Below, techniques are described that can reduce the average power overhead for a mobile user to a negligible amount (<1% battery drain per day). In one embodiment, all the sensed data will be processed and only the inferred higher level activities and processed fingerprint signature will be uploaded. Since raw sensor data is not uploaded, the data upload cost is greatly reduced and privacy concerns are also mitigated. In another embodiment, the semantic labeling system 400 uploads data to the cloud or server 133 (FIG. 2) only when the devices are connected to the charger, and using Wi-Fi. In one example, this policy reduces the data cost and power overhead for the user device. In yet another embodiment, all sensing components that are power hungry are enabled only when it is detected that the user is inside a shopping mall or any other points of interest. Since these visits are rare for many users (e.g., once a week or less on average), the average power overhead is greatly reduced. The activity recognition processing is also duty-cycled based on the user's behavior patterns. For example, to map the home, the semantic labeling system 400 may reduce the sampling rate when the user is performing long duration activities, such as sleeping/watching TV, and increase the sampling rate during short duration activities, such as eating a snack. In another embodiment, in a shopping mall or any other point of interest, there may be hundreds/thousands of users at any point of time. The semantic labeling system 400 does not need to collect data from all these devices at the same time, since the semantic labeling system 400 only needs consensus from a few devices to determine the semantic label of a place. In one embodiment, policies are used to select only a small fraction of users whose devices will be used for data collection. In one example, the policies will take into account power remaining in each device, time of day, and typical usage pattern of each device. Users will be selected in such a way that the data collection does not hamper a typical usage pattern for the remainder of the day. Also, only those users who are in unknown locations for which semantic labels or fingerprints are not yet determined will be selected.

Figure 9:
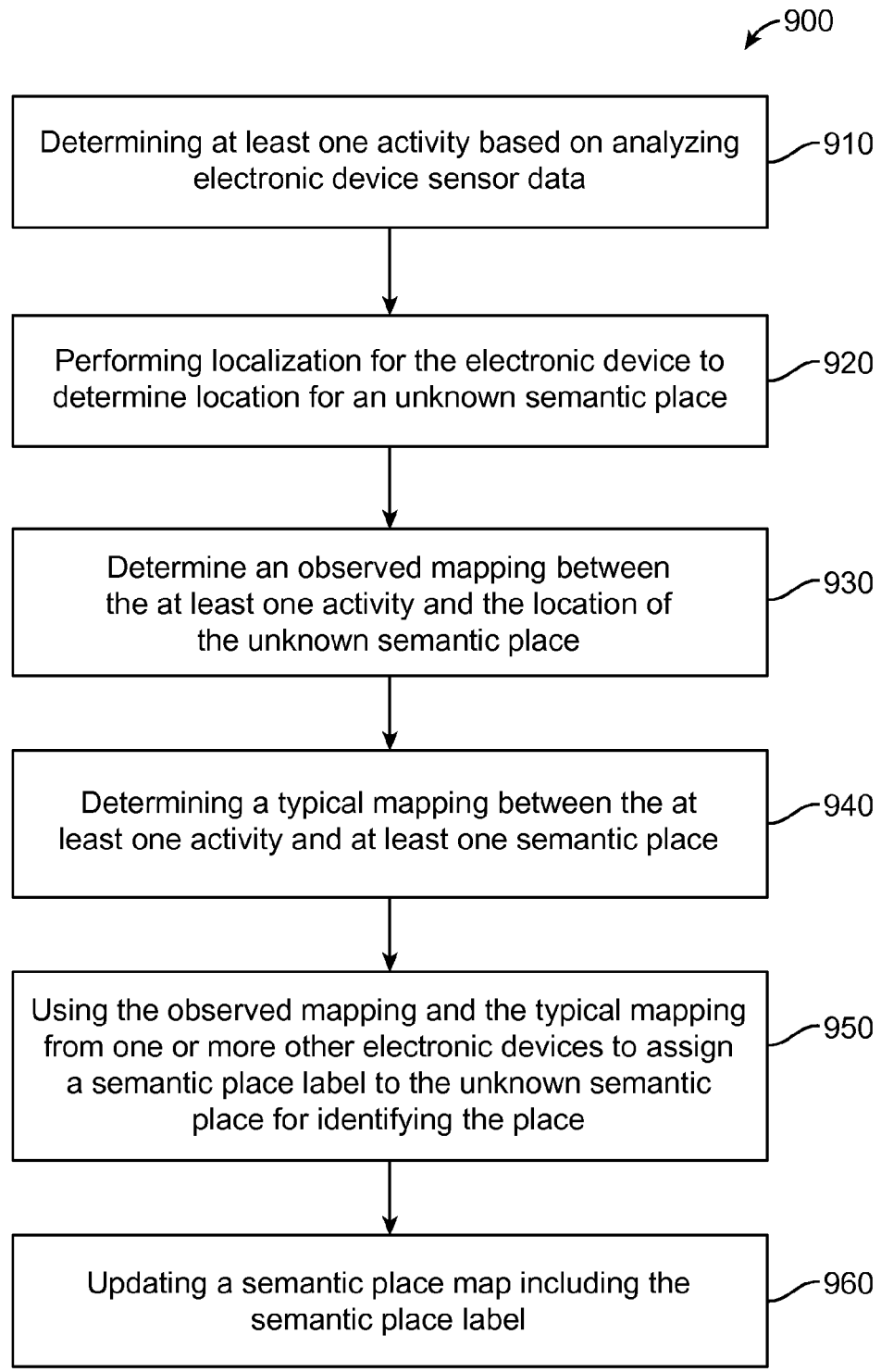
FIG. 9 shows a process for automatic semantic labeling based on activity recognition, according to one embodiment.

FIG. 9 shows a process 900 for automatic semantic labeling based on activity recognition, according to one embodiment. In one embodiment, in block 910 at least one activity is determined based on analyzing electronic device sensor data (e.g., from sensors 1-N 131, FIG. 2). In block 920, localization for the electronic device is performed to determine location for an unknown semantic place. In block 930, an observed mapping is determined between the at least one activity and the location for the unknown semantic place. In block 940, observed typical mapping is learned between the at least one activity and at least one semantic place. In block 950, the observed mapping and the typical mapping obtained from one or more other electronic devices are used to assign a semantic place label representing the at least one semantic place to the location for the unknown semantic place. In block 960, a semantic place map is updated to include the semantic place label.

In one embodiment, process 900 may further include targeting at least one advertisement or incentive based message based on location and the at least one semantic place. Process 900 may also further include determining a count for a multiple participants in the at least one determined activity at a particular determined location and the at least one semantic place. Process 900 may additionally include providing messaging to a smart device based on the location and the semantic place.

In one embodiment, process 900 may include differentiating between two semantic places with a same temporal occupancy pattern based on at least one activity and identification for the electronic device. Process 900 may also include identifying a franchise name or subcategory of the at least one semantic place by using at least one of: unique activity patterns, device identification information or place layout.

In one embodiment, process 900 may further include eliminating location error by differentiating neighboring places based on determining the at least one activity. Process 900 may additionally include automatically updating a building layout with sematic labels for one or more rooms and individual areas, and forwarding the updated semantic place map to emergency responders in advance of an emergency situation.

In one embodiment, process 900 may include determining a current location of the electronic device, and reducing energy consumption in a structure by using the current location of the electronic device and the at least one activity based on at least one of: turning off appliances in a different location or adjusting a setting for one or more devices. Process 900 may additionally include reducing sampling rate for electronic device sensors based on determined activity patterns and the location.

Figure 10:
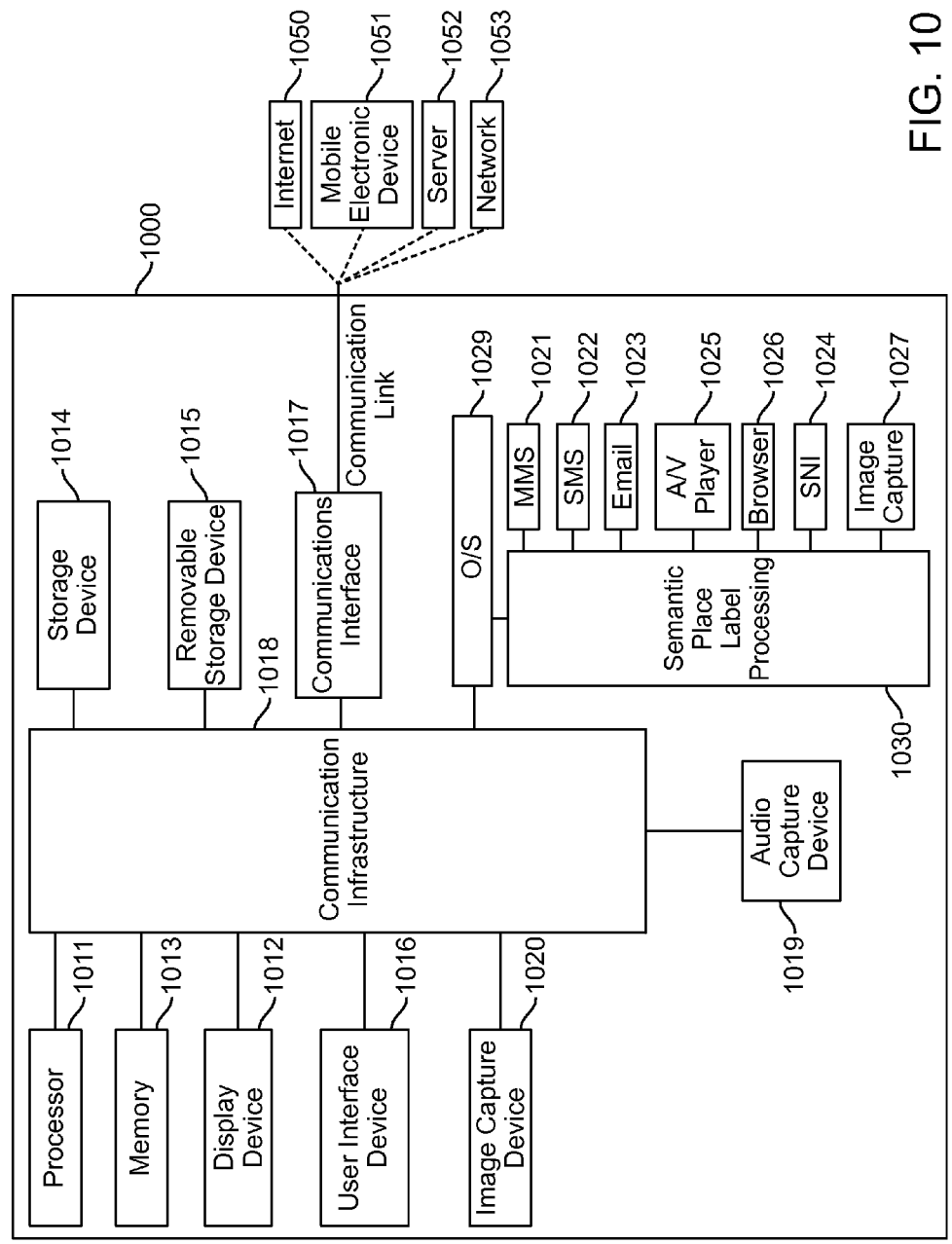
FIG. 10 is a high-level block diagram showing an information processing system comprising a computing system implementing one or more embodiments.

FIG. 10 is a high-level block diagram showing an information processing system comprising a computing system 1000 implementing one or more embodiments. The system 1000 includes one or more processors 1011 (e.g., ASIC, CPU, etc.), and may further include an electronic display device 1012 (for displaying graphics, text, and other data), a main memory 1013 (e.g., random access memory (RAM), cache devices, etc.), storage device 1014 (e.g., hard disk drive), removable storage device 1015 (e.g., removable storage drive, removable memory, a magnetic tape drive, optical disk drive, computer-readable medium having stored therein computer software and/or data), user interface device 1016 (e.g., keyboard, touch screen, keypad, pointing device), and a communication interface 1017 (e.g., modem, wireless transceiver (such as Wi-Fi, Cellular), a network interface (such as an Ethernet card), a communications port, or a PCMCIA slot and card).

The communication interface 1017 allows software and data to be transferred between the computer system and external devices through the Internet 1050, mobile electronic device 1051, a server 1052, a network 1053, etc. The system 1000 further includes a communications infrastructure 1018 (e.g., a communications bus, cross bar, or network) to which the aforementioned devices/interfaces 1011 through 1017 are connected.

The information transferred via communications interface 1017 may be in the form of signals such as electronic, electromagnetic, optical, or other signals capable of being received by communications interface 1017, via a communication link that carries signals and may be implemented using wire or cable, fiber optics, a phone line, a cellular phone link, an radio frequency (RF) link, and/or other communication channels.

In one implementation of one or more embodiments in a mobile wireless device (e.g., a mobile phone, smartphone, tablet, mobile computing device, wearable device, etc.), the system 1000 further includes an image capture device 1020, such as a camera 128 (FIG. 2), and an audio capture device 1019, such as a microphone 122 (FIG. 2). The system 1000 may further include application interfaces as MMS interface 1021, SMS interface 1022, email interface 1023, social network interface (SNI) 1024, audio/video (AV) player 1025, web browser 1026, image capture interface 1027, etc.

In one embodiment, the system 1000 includes semantic place label processing interface 1030 that may implement semantic labeling system 400 processing as described in FIG. 4. In one embodiment, the semantic place label processing interface 1030 may implement the semantic labeling system 400 (FIG. 4) and flow diagram 900 (FIG. 9). In one embodiment, the semantic place label processing (e.g., processor, interface, etc.) 1030 along with an operating system 1029 may be implemented as executable code residing in a memory of the system 1000. In another embodiment, the semantic place label processing interface 1030 may be provided in hardware, firmware, etc.

As is known to those skilled in the art, the aforementioned example architectures described above, according to said architectures, can be implemented in many ways, such as program instructions for execution by a processor, as software packages, microcode, as computer program product on computer readable media, as analog/logic circuits, as application specific integrated circuits, as firmware, as consumer electronic devices, AV devices, wireless/wired transmitters, wireless/wired receivers, networks, multi-media devices, as hardware interfaces, etc. Further, embodiments of said Architecture can take the form of an entirely hardware embodiment, an embodiment containing both hardware and software elements, etc.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software packages or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface.

Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method comprising:
   recognizing an activity performed at a first place based on sensor data of an electronic device, wherein the first place comprises an unlabeled semantic place without an assigned semantic place label;
   determining a location for the first place by performing localization for the electronic device;
   determining an observed mapping between the activity and the location for the first place;
   determining a typical mapping between the activity and a second place, wherein the second place comprises a labeled semantic place with an assigned semantic place label;
   based on the observed mapping and the typical mapping, assigning the same sematic place label assigned to the labeled semantic place to the location for the first place; and
   updating a semantic place map to include the semantic place label assigned to the location for the first place.

2. The method of claim 1, further comprising targeting at least one advertisement or incentive based message based on the location for the first place and the labeled semantic place.

3. The method of claim 1, further comprising:
   determining a count of one or more participants participating in the activity at the location for the first place and the labeled semantic place.

4. The method of claim 1, further comprising:
   providing messaging to a smart device based on the location for the first place and the labeled semantic place.

5. The method of claim 1, further comprising:
   differentiating between two places with a same temporal occupancy pattern based on at least one of the activity and device identification information for the electronic device.

6. The method of claim 1, further comprising:
   identifying one of a franchise name or a subcategory of the first place based on at least one of: a unique activity pattern, device identification information for the electronic device, or a layout of the first place.

7. The method of claim 1, further comprising:
   differentiating neighboring places based on the activity.

8. The method of claim 1, further comprising:
   automatically updating a building layout with a sematic place label assigned to one of a room or an individual area; and
   forwarding the updated semantic place map to an emergency responder.

9. The method of claim 1, further comprising:
   determining a current location of the electronic device; and
   reducing energy consumption based on the current location of the electronic device and the activity, wherein the reducing comprises at least one of: turning off an appliance in a different location or adjusting a setting for a device.

10. The method of claim 1, further comprising:
    reducing sampling rate for a sensor of the electronic device based on the activity and the location for the first place.

11. An apparatus comprising:
    at least one processor; and
    a non-transitory processor-readable memory device storing instructions that when executed by the at least one processor causes the at least one processor to perform operations including:
    recognizing an activity performed at a first place based on sensor data of an electronic device, wherein the first place comprises an unlabeled semantic place without an assigned semantic place label;
    determining a location for the first place by performing localization for the electronic device;
    determining an observed mapping between the activity and the location for the first place;
    determining a typical mapping between the activity and a second place, wherein the second place comprises a labeled semantic place with an assigned semantic place label;
    based on the observed mapping and the typical mapping, assigning the same sematic place label assigned to the labeled semantic place to the location for the first place; and
    updating a semantic place map to include the semantic place label assigned to the location for the first place.

12. The apparatus of claim 11, wherein the operations further comprise:
    receiving at least one advertisement or incentive based message based on the location for the first place and the labeled semantic place.

13. The apparatus of claim 11, wherein the operations further comprise:
    determining a count of one or more participants in the activity at the location for the first place and the labeled semantic place.

14. The apparatus of claim 11, wherein the operations further comprise:
    messaging to a smart device based on the determined location and the semantic place label.

15. The apparatus of claim 11, wherein the operations further comprise:
    differentiating between two places with a same temporal occupancy pattern based on at least one of the activity and device identification information for the electronic device.

16. The apparatus of claim 11, wherein the operations further comprise:
    identifying one of a franchise name or a subcategory of the first place based on at least one of: a unique activity pattern, device identification information for the electronic device, or a layout of the first place.

17. The apparatus of claim 11, wherein the operations further comprise:
    eliminating location noise by differentiating neighboring places based on the activity.

18. The apparatus of claim 11, wherein the operations further comprise:
    updating a building layout with a sematic place label assigned to one of a room or an individual area; and forwarding the updated semantic place map to an emergency responder.

19. The apparatus of claim 11, wherein the operations further comprise:
determining a current location of the electronic device; and
reducing energy consumption based on the current location of the electronic device and the activity, wherein the reducing comprises at least one of: turning off an appliance in a different location or adjusting a setting for a device.

20. The apparatus of claim 11, wherein the operations further comprise:
reducing a sampling rate for a sensor of the electronic device based on the activity pattern and the location for the first place.

21. A non-transitory processor-readable medium that includes a program that when executed by a processor performs a method comprising:
recognizing an activity performed at a first place based on sensor data of an electronic device, wherein the first place comprises an unlabeled semantic place without an assigned semantic place label;
determining a location for the first place by performing localization for the electronic device;
determining an observed mapping between the activity and the location for the first place;
determining a typical mapping between the activity and a second place, wherein the second place comprises a labeled semantic place with an assigned semantic place label;
based on the observed mapping and the typical mapping, assigning the same sematic place label assigned to the labeled semantic place to the location for the first place; and
updating a semantic place map to include the semantic place label assigned to the location for the first place.

22. The non-transitory processor-readable medium of claim 21, further comprising targeting at least one advertisement or incentive based message based on the location for the first place and the labeled semantic place.

23. The non-transitory processor-readable medium of claim 21, further comprising:
determining a count of one or more participants participating in the activity at the location for the first place and the labeled semantic place.

24. The non-transitory processor-readable medium of claim 21, further comprising:
providing messaging to a smart device based on the location for the first place and the labeled semantic place.

25. The non-transitory processor-readable medium of claim 21, further comprising:
differentiating between two places with a same temporal occupancy pattern based on at least one of the activity and device identification information for the electronic device.

26. The non-transitory processor-readable medium of claim 21, further comprising:
identifying one of a franchise name or a subcategory of the first place based on at least one of: a unique activity pattern, device identification information for the electronic device, or a layout of the first place.

27. The non-transitory processor-readable medium of claim 21, further comprising differentiating neighboring places based on the activity.

28. The non-transitory processor-readable medium of claim 21, further comprising:
automatically updating a building layout with a sematic place label assigned to one of a room or an individual area; and
forwarding the updated semantic place map to an emergency responder.

29. The non-transitory processor-readable medium of claim 21, further comprising:
determining a current location of the electronic device; and
reducing energy consumption based on the current location of the electronic device and the activity, wherein the reducing comprises at least one of: turning off an appliance in a different location or adjusting a setting for a device.

30. The non-transitory processor-readable medium of claim 21, further comprising:
reducing sampling rate for a sensor of the electronic device based on the activity and the location for the first place.

* * * * *